United States Patent
Mölkner et al.

(10) Patent No.: US 6,189,205 B1
(45) Date of Patent: Feb. 20, 2001

(54) PROCESS FOR PRODUCING PRESSURE SENSORS

(75) Inventors: Thomas Mölkner, Stuttgart; Martin Mast, Gerlingen; Jörg Wolf, Karlsruhe; Horst Münzel, Reutlingen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/254,112

(22) PCT Filed: Aug. 21, 1997

(86) PCT No.: PCT/DE97/01800

§ 371 Date: Sep. 24, 1999

§ 102(e) Date: Sep. 24, 1999

(87) PCT Pub. No.: WO98/09145

PCT Pub. Date: Mar. 5, 1998

(30) Foreign Application Priority Data

Aug. 27, 1996 (DE) .............................................. 196 34 561

(51) Int. Cl.[7] .................................................. H01C 17/06
(52) U.S. Cl. .............................................................. 29/620
(58) Field of Search ................................... 29/610.1, 620, 29/621, 622; 83/801, 800, 360; 264/129; 427/101

(56) References Cited

U.S. PATENT DOCUMENTS 4,357,848 * 11/1982 Sakurai ................................... 83/801
5,937,263 * 7/1999 Muramatsu ......................... 125/13.02
6,001,666 * 12/1999 Diem ....................................... 438/52

FOREIGN PATENT DOCUMENTS

| 31 08 300 | 3/1982 | (DE) . |
| 40 28 376 | 3/1992 | (DE) . |
| 2174241 | 10/1986 | (GB) . |
| 59-132327 | 7/1984 | (JP) . |
| 61-269033 | 11/1986 | (JP) . |

OTHER PUBLICATIONS

O. Dössel et al., "Silizium Unter Druck" Elektrotechnik, vol. 67, No. 23/24, pp. 22–28 (Dec. 1985).*

* cited by examiner

Primary Examiner—Lee Young
Assistant Examiner—Sean Smith
(74) Attorney, Agent, or Firm—Kenyon & Kenyon

(57) ABSTRACT

A method for manufacturing pressure sensing elements which have a metal membrane and a resistive thin film arranged thereon, in which a blind opening is introduced into a base element, and the resistive thin film is applied on a side of the base element facing away from the blind opening. Provision is made for a plurality of pressure sensing elements to be manufactured simultaneously in one panel, and after application of the resistive thin film onto the panel, the panel is sectioned to yield the pressure sensing elements.

5 Claims, 3 Drawing Sheets

PROCESS FOR PRODUCING PRESSURE SENSORS

BACKGROUND OF THE INVENTION

The present invention relates to a method for manufacturing pressure sensing elements.

Pressure sensing elements of many different kinds are known. Because of their versatility and their suitability for a wide pressure range (for example, from 10 to 2000 bar), pressure sensing elements having a metal membrane and a resistive thin film arranged thereon have proven particularly suitable. A "resistive thin film" will be mentioned hereinafter; it is clear that this includes a plurality of individual films of various functions which together yield the resistive thin film. These pressure sensing elements possess a base element which has a measurement opening that is covered by the metal membrane (bottom of the measurement opening). When the measurement opening is acted upon by a pressure to be measured, the metal membrane and thus the resistive thin film applied onto the membrane experience a deflection which is detectable via suitable analysis means. It is known to manufacture pressure sensing elements of this kind by laborious individual production. In this, the base elements of the pressure sensing elements are produced from metal as turned parts; they are equipped with a blind opening; and then the resistive thin film is applied. Since this individual production is very laborious, manufacture in large quantities is not possible.

In order to allow more effective manufacture of the pressure sensing elements, it is known to process a larger number of pressure sensing elements, for example 50 to 70 units, using the so-called carrier technique. For this, the base elements, individually turned and polished and having the blind openings, are inserted into a carrier structure, for example a perforated panel, and are then together equipped with the resistive thin film. The disadvantage in this context, however, is that the film deposition process for applying the resistive thin film simultaneously contaminates the carrier element, so that the latter must be subjected to a laborious cleaning operation before being reused. A further disadvantage is that the carrier elements must be populated with the base elements and then, once processed, the pressure sensing elements must be removed from the carrier element. Another disadvantage is that the different processes, for example coating and photolithography, also require different carrier systems. The precision of the carrier directly affects the geometric accuracy of the individual elements.

SUMMARY OF THE INVENTION

The method according to the present invention having the features recited in Claim 1 has, in contrast, the advantage that a plurality of pressure sensing elements can easily be manufactured simultaneously. Because a plurality of pressure sensing elements are simultaneously manufactured in one panel (multiple panel) of base elements, and the latter, after application of the resistive thin film, is sectioned into the base elements which yield the pressure sensing elements, it is advantageously possible to manufacture the pressure sensing elements with high precision without complex additional auxiliary devices. Additional operations such as introduction into and removal from a carrier element are entirely superfluous. In addition, the processes of depositing the resistive thin film over a large panel which is then sectioned into the pressure sensing elements is very much easier to manage in process-engineering terms. Sectioning of the pressure sensing elements, once processed, can be accomplished using high-precision techniques, preferably by laser cutting, water-jet cutting, or wire electrodischarge machining, so that no further processing of the pressure sensing elements is necessary after sectioning.

By optimizing the arrangement of the pressure sensing elements on the shared panel, the space available can be exploited to the greatest possible extent, so that only minimal waste remains after the pressure sensing elements are sectioned. All in all, pressure sensing elements can thereby be very advantageously produced in large quantities and with consistently high quality, in a manner suitable for mass production.

DETAILED DESCRIPTION

Figure 1:
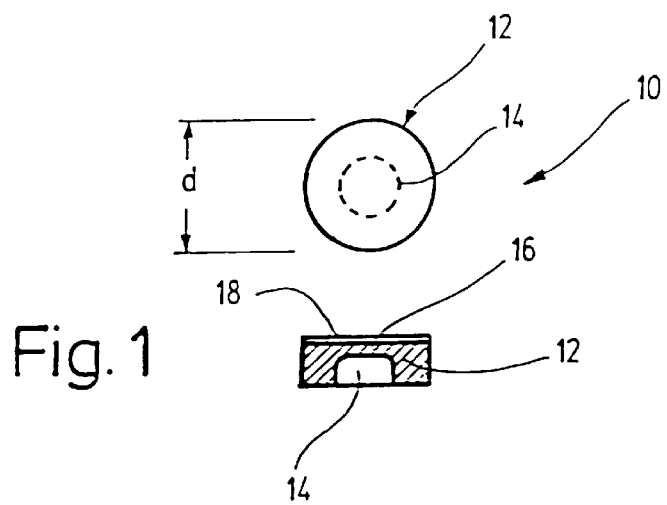
FIG. 1 shows a plan view of and a sectioned depiction through an individual pressure sensing element.

FIG. 1 shows a pressure sensing element 10 in a plan view and a sectioned depiction. Pressure sensing element 10 possesses a base element 12 which is, for example, of round configuration. According to other exemplary embodiments (not depicted), base element 12 can also have other geometrical shapes. Base element 12 has a measurement opening 14 which is delimited on one side by a measurement membrane 16, thus creating a blind opening. Measurement membrane 16 is constituted by the bottom of measurement opening 14, so that base element 12 and measurement membrane 16 are configured in one piece. A resistive thin film 18 in the form of a Wheatstone bridge is configured on measurement membrane 16; the film deposition process for creating the resistive thin film 18 will not be discussed in further detail in the present description. Base elements 12 are usually made of a high-strength stainless steel. The structure and manner of operation of pressure sensing element 10 shown in FIG. 1 are commonly known.

Figure 4:
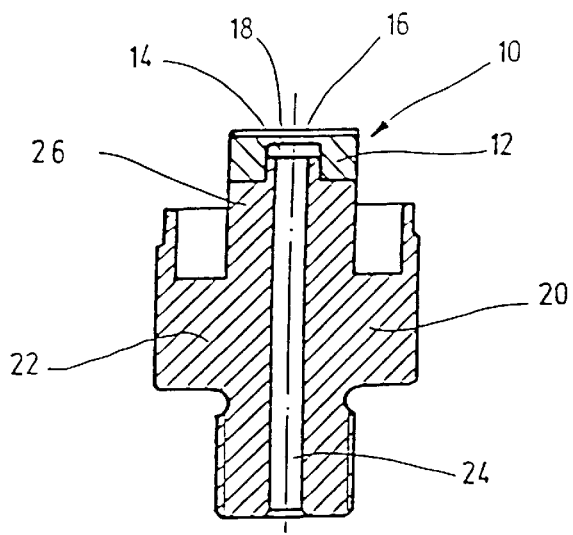
FIG. 4 shows a sectioned depiction through a pressure sensor (pressure sensing element on pressure connector).

FIG. 4 illustrates an example of the use of a pressure sensing element 10. The latter is arranged on a pressure connector 20 which has, in a housing 22, a passthrough opening 24 which communicates with a medium to be measured, for example a gaseous or liquid medium. Passthrough opening 24 is closed off by pressure sensing element 10, base element 12 being mounted on an installation flange 26 of housing 22. To achieve a sufficiently permanent and secure joining, base element 12 can be adhesively bonded, welded, soldered, etc. to flange 22, the joining technique being based on the quality requirements for the measurement result attained with pressure sensor 10. In operation, measurement opening 14 is acted upon via passthrough opening 24 by a pressure or vacuum, so that measurement membrane 16 experiences a deflection. This deflection of measurement membrane 16 can be analyzed using known methods, for example resistively (Wheatstone bridge). The deflection of measurement membrane 16 is proportional to the pressure conditions existing in measurement opening 14, so that conclusions can be drawn as to the pressure or vacuum that is present.

Figure 2:
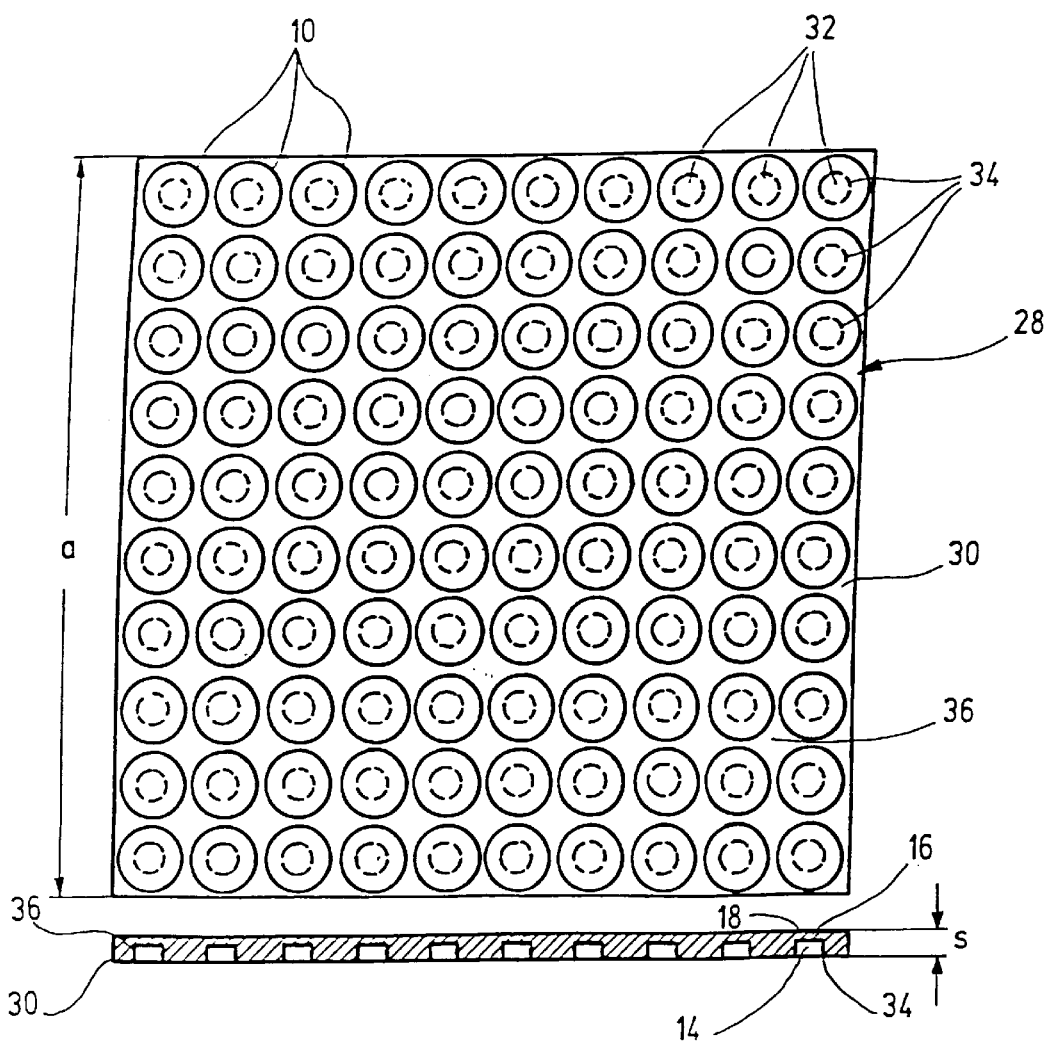
FIG. 2 shows a plan view of and a sectioned depiction through a panel for manufacturing the pressure sensing element in accordance with the present invention.

The manner in which pressure sensing elements 10 are manufactured according to the present invention will now be discussed. For this purpose, FIG. 2 shows a square panel 28 which has an edge length a. In other exemplary embodiments (not depicted), panel 28 can of course also possess a different geometrical shape, for example rectangular, circular, trapezoidal, etc. In the example shown in FIG. 2, edge length a is selected to be greater than ten times the diameter d of a pressure sensing element 10. As a result, there is room on panel 28 for a total of 100 pressure sensing elements 10. In the initial state, panel 28 exists as a flat stainless-steel plate 30 with a thickness s. Plate 30 possesses blind openings 34 (measurement openings 14) in a predefined pattern 32, so that plate 30 exists, so to speak, as a unilaterally perforated panel 28. Pattern 32 of blind openings 34 is selected so that the spacing between the center lines of adjacent blind openings 34 is selected to be slightly greater than the diameter d of the later pressure sensing elements 10.

The operations (known per se) for patterning a resistive thin film 18 are then performed on surface 36 of plate 30 facing away from blind openings 34. This is accomplished by polishing surface 36 if applicable, then depositing an insulation layer (in thin-film or thick-film technology), depositing a resistive thin film 18, for example sputtering polysilicon or metals, photolithographic patterning, deposition of a contact film, possible patterning of the contact film, and subsequent application of a passivation film. The production of such film systems is commonly known, and therefore will not be described in detail.

What is critical is that according to the present invention, provision is made for production of the film system to be accomplished over the entire surface 36 of panel 28. In production-engineering terms, this offers considerable advantages as compared with deposition of a resistive thin film 18 on an individual pressure sensing element 10, most of all because only one exact alignment for each panel 28, rather than for each sensing element 10 as elsewhere, needs to be performed. In addition, it is easier to deposit the individual films in respectively uniform thicknesses on a larger, continuous panel 28, so that tolerance differences between the individual pressure sensing elements 10 are reduced.

The plan view shown in FIG. 2 indicates the respective positions of the individual pressure sensing elements 10. Sectioning out of panel 28 is then accomplished in accordance with the selected geometry of pressure sensing elements 10, for example in accordance with diameter d. High-precision cutting techniques, for example laser cutting, wire electrodischarge machining, or water-jet cutting, can be used for this.

All in all, it is thus possible to produce simultaneously, using simple operations, a plurality of pressure sensing elements 10 that are characterized by high precision and small tolerance differences. The method according to the present invention can easily be carried out in low-cost fashion for mass production of, for example, several million units per year.

Sectioning of panel 28, equipped with resistive thin film 18, into the individual pressure sensing elements 10 does not result in any contamination of support elements provided for auxiliary purposes, so that auxiliary processes, for example populating the support elements, removing the completed pressure sensing elements 10, and cleaning the support elements, are entirely superfluous. The residues of panel 28 remaining after the sectioning of pressure sensing elements 10 can, for example, be collected, recycled, and sent on for some other use.

Figure 3:
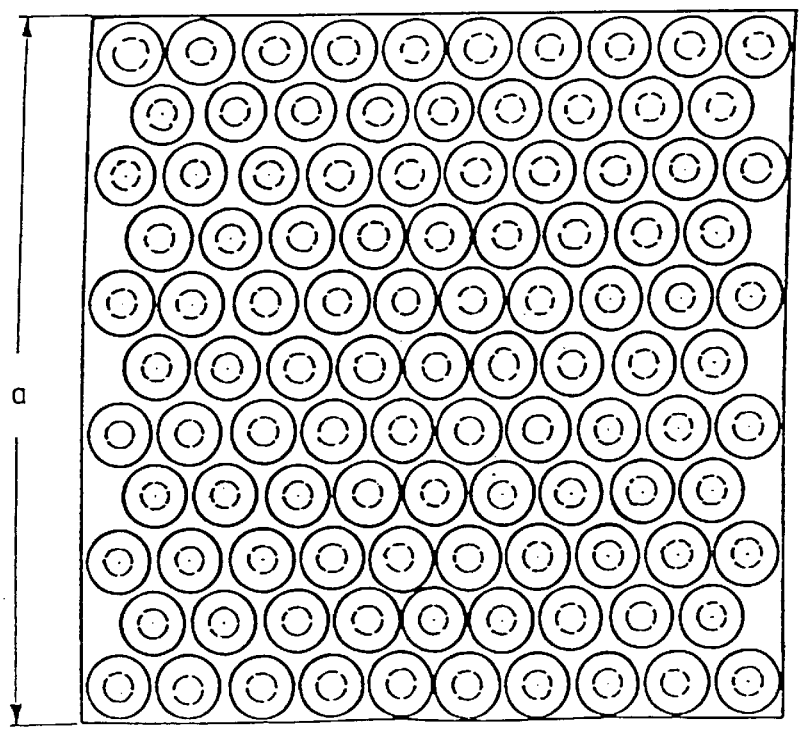
FIG. 3 shows a plan view of a panel in a further variant embodiment of the present invention.

As shown in FIG. 3 (parts identical to those in FIG. 2 being given identical reference characters and not explained again), optimization of pattern 32 can result in better utilization of the surface area of panel 28. As a result, there remains after the sectioning of pressure sensing elements 10 a smaller residue of panel 28 that cannot be used for the manufacture of pressure sensing elements 10. As compared with the exemplary embodiment shown in FIG. 2, it is possible, with a panel 28 having an identical edge length a and pressure sensing elements 10 with identical diameters d, to achieve an approximately 5% higher production yield because of the greater packing density. Panel 28 can very advantageously be manufactured, for example, using a metal injection molding method or a sintering method. Panel 28 can thereby be manufactured without complex additional procedures, such as, for example, metal removal. These methods moreover make possible easy shaping with high precision, along with low waste.

Figure 5:
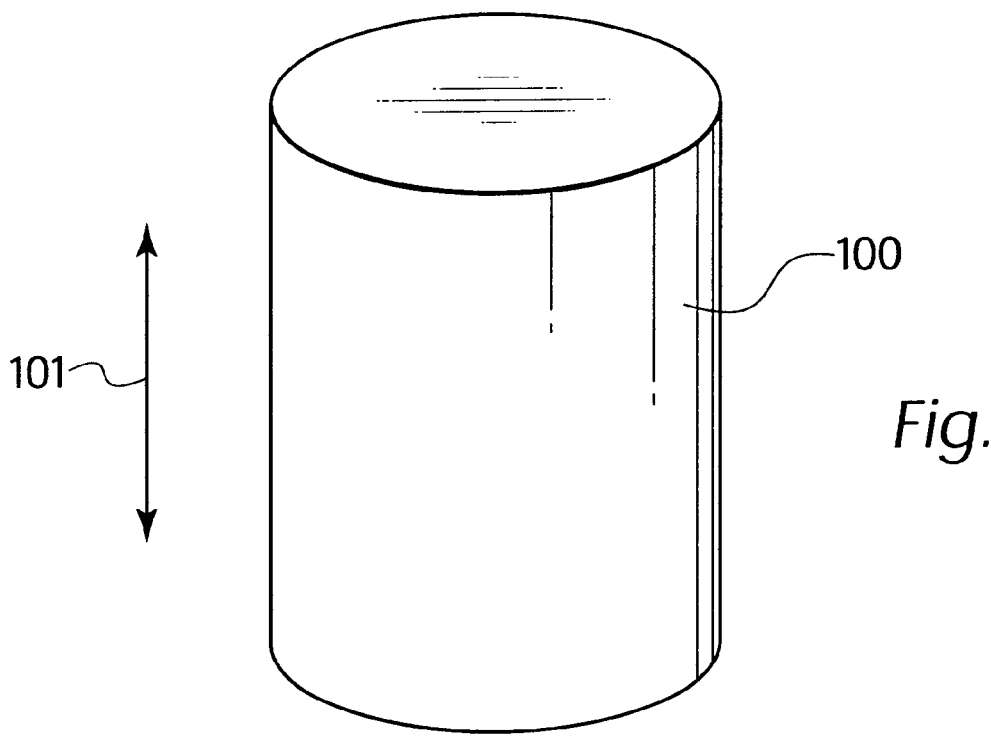
FIG. 5 shows one view of a method for providing a panel for manufacturing pressure sensing elements.
Figure 6:
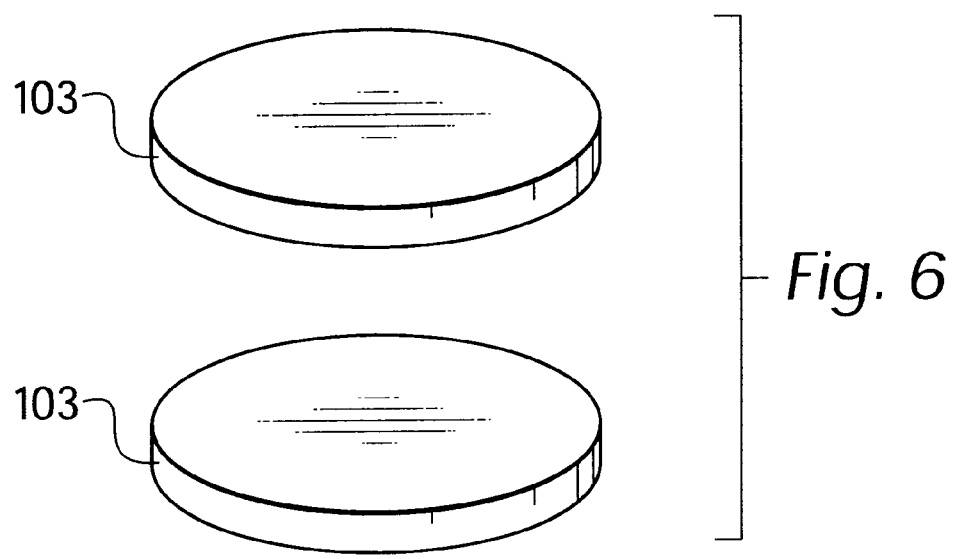
FIG. 6 shows another view of a method for providing a panel for manufacturing pressure sensing elements.

One particularly advantageous method will now be explained with reference to FIGS. 5 and 6. FIG. 5 shows a round steel bar 100 whose diameter corresponds substantially to the size of the requisite panel 28. The essential feature of round steel bar 100 is that during manufacture it was rolled only in the longitudinal direction, as indicated by arrow 101. Such rolling is necessary in order to shape round steel bar 100, and can moreover be used to influence the properties of the steel material. The material envisioned here for round steel bar 100 is, in particular, a stainless steel with spring characteristics. For example, a high-alloy stainless steel×5 CrNiCuNb 17 4, with DIN material number 1.4542 or 1.4548, is suitable. Stainless steel materials of this kind have proven successful for the manufacture of pressure sensing elements 10. Individual steel substrates 103 are then fabricated by sawing perpendicular to the longitudinal direction of round steel bar 100, as shown in FIG. 6. These individual steel substrates 103 have, for example, a thickness of 5 mm. In order to achieve a high surface quality, the individual stainless steel substrates 103 are then ground, lapped, and polished, thereby achieving, for example, surface roughness values of less than half a micrometer. The diameters selected for stainless steel substrates 103 are advantageously the usual dimensions for semiconductor technology, for example 4 inches or 6 inches, so that stainless steel substrates 103 can also be processed with the usual apparatus for silicon wafer processing. Blind openings 34 are then introduced on the back side by milling, drilling, electrodischarge machining, etching, or other processing methods, as shown in cross section, for example, in FIG. 2. Further processing is then accomplished in the usual apparatus for semiconductor processing. First a thin insulation film, for example silicon oxide, silicon nitride, or the like, is applied. This is then followed by deposition of a resistive thin film 18, for example polysilicon or thin metal films. A photoresist film is then applied, and patterned through a mask. The photoresist film patterned in this fashion then serves as a mask for patterning the resistive thin film 18. The photoresist film is then removed, and a metal film is applied for contacting the resistive thin film 18. This metal film is then patterned in a further patterning step using a photoresist film. Then a passivation film is applied. What is essential here is that all the apparatus and methods known from thin-film technology or semiconductor technology can be used, applied concurrently and simultaneously for a plurality of pressure sensing elements 10. As a result, a plurality of pressure sensing elements 10 can be produced concurrently. In a subsequent step, the stainless steel substrate 103 is then sectioned in order to obtain the individual pressure sensing elements 10, for example by wire electrodischarge machining. Computer-controlled wire electrodischarge machines can, for example, be used in this context, so that the individual pressure sensing elements 10 are cut out from the panel in low-cost fashion.

The advantage of such steel substrates 103, obtained from a round steel bar 100 that has been rolled only in longitudinal direction 101, is that the stress in such stainless steel substrates 103 is inherently particularly low. Steel sheets obtainable commercially are usually rolled parallel to the surface. This rolling, however, leaves internal mechanical stresses in the material, which results in distortion and warping during the subsequent processing steps. The internal stresses in steel membranes which have been rolled parallel to the surface can be so great that they result in appreciable falsification of the measurement signal of a pressure sensing element produced in that fashion. This is prevented by the use of steel substrates 103 obtained from a longitudinally rolled round bar 100. Sensing elements 10 of this kind are therefore of particularly high quality. In addition to a round bar 100, other shapes of longitudinally rolled steel bars 100 can, of course, also be used, for example a rectangular steel bar.

What is claimed is:

1. A method for manufacturing a plurality of pressure sensing elements, each pressure sensing element having a metal membrane and a resistive thin film arranged thereon, comprising the steps of:

manufacturing a panel by performing the steps of:

performing one of a metal injection method and a sintering method to produce a steel bar having a longitudinal axis and rolled only along the longitudinal axis, and obtaining stainless-steel substrates for the panel by dividing up the steel bar in a direction perpendicular to the longitudinal axis;

introducing blind openings into a base element of the panel; and simultaneously manufacturing the plurality of pressure sensing elements in the panel by performing the steps of:

applying the resistive thin film on a side of the base element facing away from the blind openings, and after applying the resistive thin film onto the base element of the panel, sectioning the panel in order to yield the individual pressure sensing elements.

2. The method according to claim 1, wherein the blind openings are arranged in a pattern corresponding to a sectioning path followed in the sectioning step.

3. The method according to claim 1, wherein the resistive thin film is applied to an entire surface of the side of the base element facing away from the blind openings.

4. The method according to claim 1, wherein the step of sectioning the panel includes the step of performing a high-precision cutting operation in accordance with one of a laser cutting technique, an electrodischarge machining technique, and a water jet cutting technique.

5. The method according to claim 1, wherein a material of the steel bar includes a spring steel.

\* \* \* \* \*